Nov. 26, 1968      W. M. DILLON      3,413,112
METHOD FOR FIRING GREEN PELLETS BY INDUCTION HEATING
Filed Feb. 2, 1966
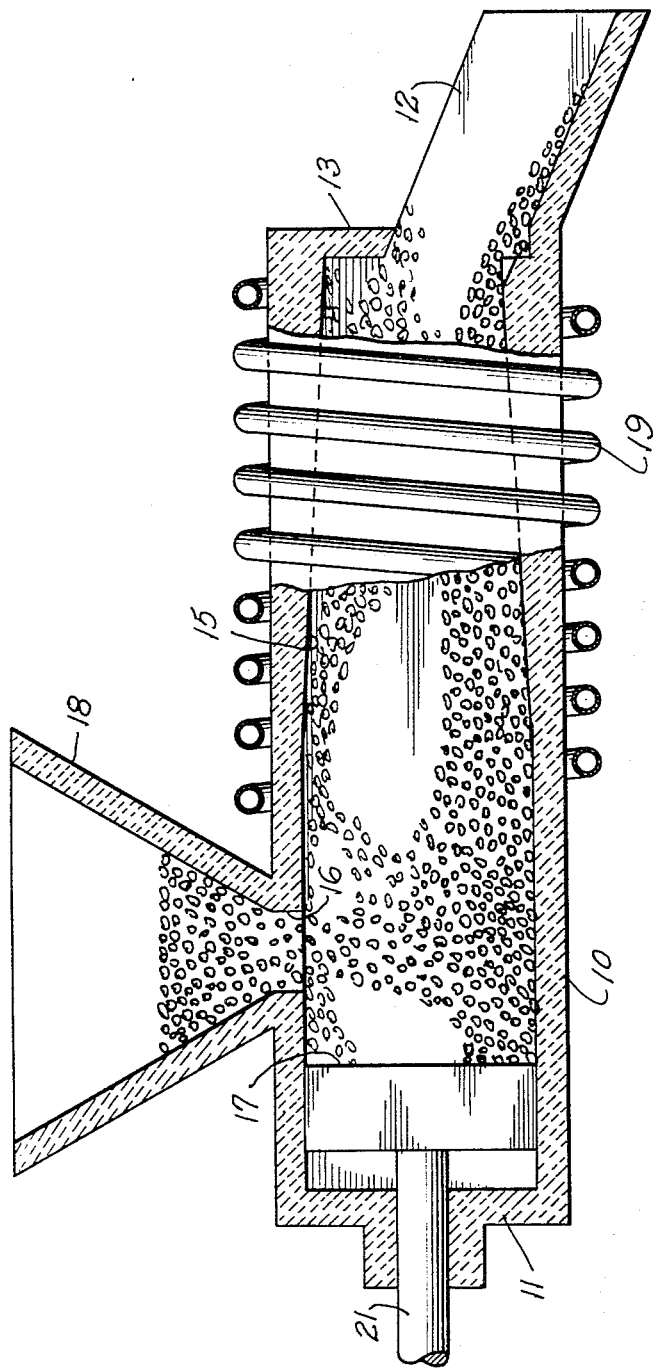
INVENTOR.
Washington Martin Dillon
BY *Hill, Sherman, Meroni, Gross & Simpson*      ATTORNEYS 3,413,112
METHOD FOR FIRING GREEN PELLETS BY INDUCTION HEATING
Washington Martin Dillon, Sterling, Ill., assignor to Northwestern Steel and Wire Company, Sterling, Ill., a corporation of Illinois
Filed Feb. 2, 1966, Ser. No. 524,512
2 Claims. (Cl. 75—5)

ABSTRACT OF THE DISCLOSURE

Method and apparatus for drying green pellets. The pellets are supplied to one end of a horizontal chute or conduit. The chute is made from a ceramic or refractory material which acts as an insulator impervious to magnetic fields. The chute has a hopper adjacent its receiving end for supplying pellets to the chute and has a converging discharge end having a restricted opening. A piston is mounted in the chute behind the hopper, for reciprocable movement along the chute to exert compressive forces on the pellets and thereby compact the pellets and force the pellets toward the discharge end of the chute. A coil energized with high frequency power is wound about the chute and induces eddy currents in the compacted pellets, to produce the heat required for firing the pellets. The supply of pellets in the hopper is greater than the pellets discharged through the outlet. The pellets thus may be continuously compacted along the chute, by reciprocation of the piston, which also forces the dried pellets for flow through the outlet in a continuous operation.

*Background and objects of invention*

In the drying or firing of green iron concentrate pellets commonly extracted from Taconite, the green pellets containing approximately sixty-seven percent iron are dried in a long kiln, which may be a rotary kiln but which due to the length required to fire the pellets is usually a traveling grate, which may be seventy to ninety feet long or longer, which conveys the pellets through a furnace, usually having an initial preheat zone of a temperature range between 500 to 600° F., along which the green pellets are initially conveyed, a relatively long drying and firing zone where the pellets are both dried and fired, the temperature of which may be in the order of 2000° F. and which takes up a greater part of the length of the furnace. From the drying and firing zone the grate may convey the pellets through a cooling zone from which the pellets are discharged for further treatment. Such furnaces or kilns require an undue amount of room, which usually is not readily available, and are also expensive and have a high upkeep maintenance.

It has been found that this extreme length of the firing furnace may be substantially reduced by compacting the pellets in a chute and inducing eddy currents in the pellets to generate the heat for firing the pellets, and that the high frequency power required for inducing eddy currents in the pellets may readily be controlled to attain the most efficient firing temperatures. The pellets may thus be heated to the exact temperature required for firing, in a relatively short length chute in comparison with the firing furnaces or kilns heretofore necessary for drying and firing the pellets.

A principal object of the present invention, therefore, is to improve upon the drying and firing of pellets obviating the necessity of the long kilns heretofore required and providing a more accurate control of the firing temperatures by inducing of eddy currents in the pellets to produce the heat for firing the pellets.

A further object of the invention is to provide a simplified method of firing green iron concentrate pellets, materially shortening the time heretofore required for firing the pellets, and simplifying and reducing the length of the firing equipment, by introducing the green iron pellets into a closed chute and compacting the pellets in the chute and heating the pellets to the desired firing temperatures by inducing eddy currents therein.

A still further object of the invention is to provide a simplified and improved method of firing green iron concentrate pellets by supplying the pellets to a closed ceramic chute encircled by a high frequency power induction coil and compacting the pellets as supplied, and inducing eddy currents in the pellets as compacted and firing the pellets by the heat created by the eddy currents induced.

These and other objects of the invention will appear from time to time as the following specification proceeds and with reference to the figure of the drawing diagrammatically showing a vertical sectional view through one form of apparatus that may be used to carry out the method of the present invention.

In the embodiment of the present invention illustrated in the drawing, I have shown for illustrative purposes a closed conduit or chute 10, which may be round or rectangular in cross section and is closed at one end by an end closure wall 11 and has a discharge trough 12 leading through an opposite end closure wall 13 of the chute. The chute also has an interior converging wall portion 15, converging toward the end closure wall 13 and cooperating with a reciprocably driven compacting piston 17, to restrict the pellets in said chute and to enable the pellets to be compacted with sufficient density for the induction of eddy currents therein. The chute 10 is shown as having a hopper 18 in communication with the inlet 16 and extending upwardly therefrom for supplying green iron pellets to said chute.

The chute is also shown as being encircled by a high frequency induction coil 19 which may be water cooled and which extends from the hopper 18 to the discharge end closure wall 13. The induction coil 19 may be energized by high frequency power from a motor generator or any other suitable source of power in a conventional manner which is no part of the present invention so need not be shown or described herein.

The chute 13 may be made from a material which is non-magnetic and a non-conductor of electricity and may be a ceramic or a refractory material. The chute will thus act as an insulator impervious to magnetic fields and when a coil 19 is supplied with high frequency power, eddy currents will be induced in the compacted pellets and produce the heat required for firing the pellets.

A compacting piston 17 is shown as being on the inner end of a piston rod 21, which may be reciprocably driven through a conventional crank and linkage connection (not shown), or from a hydraulic cylinder and piston (not shown) by the alternate admission of hydraulic fluid under pressure to opposite ends of the cylinder in a conventional manner. The means for reciprocably driving the compacting piston 17 may be of any well-known form and is no part of the present invention so need not herein be shown or described further.

In carrying out the invention green pellets are supplied to the chute 10 through the hopper 18 and inlet 16 and as supplied the piston 17 is reciprocably driven to progress the pellets toward the discharge end of the chute and to compact the pellets therein with sufficient density to effect the induction of eddy currents therein by energization of the coil 19.

As the pellets are compacted in the chute 10, more pellets are introduced into the chute than are discharged through the outlet trough 12, with the result that the firing operation may be a continuous operation with the continuous introduction of more pellets into the chute 10 than are discharged through the outlet trough 12. The pellets are then continuously compacted in the chute, by reciprocation of the piston 17, which also continually forces pellets to flow through the outlet trough 12.

The pellets may thus be continuously dried and fired in a simplified operation and the fired pellets may be discharged through the outlet 12 and cooled or else may be discharged directly into a melting vessel, such as an electric arc furnace or any other conventional type of melting furnace.

While I have herein shown and described one manner in which the invention may be carried out, it should readily be understood that various modifications and variations in the invention may be attained without departing from the spirit and scope of the novel concepts thereof.

I claim as my invention:

1. A method of firing green iron concentrate pellets comprising the steps of:
   creating a supply of pellets,
   confining the pellets to flow substantially horizontally along a converging closed area,
   exerting a compressive force directly on the pellets as supplied and confined to flow substantially horizontally along the converging area and thereby compacting the pellets and forcing the pellets along the converging portion of the closed area and discharging the pellets from the closed area by the compressive force exerted thereon, and
   including eddy currents in the compacted pellets and firing the pellets by the heat created by the eddy currents induced.

2. The method of claim 1,
   wherein a greater supply of pellets is maintained than discharged by the exertion of the compressive compacting forces on the pellets.

References Cited

UNITED STATES PATENTS

| | | | |
|---|---|---|---|
| 1,964,402 | 6/1934 | Kalling et al. | 75—10 |
| 2,124,262 | 7/1938 | Samuelson et al. | 75—10 |
| 2,277,067 | 3/1942 | Brassert | 75—10 |
| 2,961,411 | 11/1960 | Klugh | 75—10 |
| 3,093,474 | 6/1963 | Collin | 75—10 |
| 2,166,207 | 7/1939 | Clark | 75—11 |
| 2,359,578 | 10/1944 | Payne | 75—11 |
| 2,865,732 | 12/1958 | Jensen | 75—11 |

L. DEWAYNE RUTLEDGE, *Primary Examiner.*

ERNEST L. WEISE, *Assistant Examiner.*